US012659540B2

(12) United States Patent
Lee et al.

(10) Patent No.: US 12,659,540 B2
(45) Date of Patent: Jun. 16, 2026

(54) DISPLAY DEVICE AND CONTENT SHARING METHOD FOR SHARING CONTENT WITH EXTERNAL DISPLAY DEVICE

(71) Applicant: LG ELECTRONICS INC., Seoul (KR)

(72) Inventors: Sanghee Lee, Seoul (KR); Yuri Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/860,379

(22) PCT Filed: May 9, 2022

(86) PCT No.: PCT/KR2022/006572
§ 371 (c)(1),
(2) Date: Oct. 25, 2024

(87) PCT Pub. No.: WO2023/210851
PCT Pub. Date: Nov. 2, 2023

(65) Prior Publication Data
US 2025/0294206 A1      Sep. 18, 2025

(30) Foreign Application Priority Data

Apr. 27, 2022    (KR) ........................ 10-2022-0051891

(51) Int. Cl.
H04N 21/43          (2011.01)
H04N 21/41          (2011.01)
(Continued)

(52) U.S. Cl.
CPC ... H04N 21/43076 (2020.08); H04N 21/4122 (2013.01); H04N 21/42203 (2013.01);
(Continued)

(58) Field of Classification Search
CPC ......... H04N 21/43076; H04N 21/4122; H04N 21/42203; H04N 21/431; H04N 21/43615;
(Continued)

(56) References Cited

U.S. PATENT DOCUMENTS

2004/0187041 A1*   9/2004  Kikugawa ............. G06F 1/3265
                                                               713/300
2008/0092165 A1*   4/2008  Lee ...................... H04N 21/431
                                                               725/40
(Continued)

FOREIGN PATENT DOCUMENTS

EP          2574069          3/2013
EP          3148203          3/2017
(Continued)

OTHER PUBLICATIONS

European Patent Office Application Serial No. 22940345.6, Search Report dated Jul. 18, 2025, 11 pages.
(Continued)

*Primary Examiner* — Kyu Chae
(74) *Attorney, Agent, or Firm* — LEE, HONG, DEGERMAN, KANG & WAIMEY

(57)                    ABSTRACT

A display device according to the present disclosure comprises: a display unit; a communication unit for transmitting/receiving data to/from at least one external display device; a user input unit for receiving a screen call command from a remote control device; and a control unit for providing, in response to the screen call command, a screen selection interface, which selects an external display device having a screen to be called, receiving an input of selection of the external display device having a screen to be called, determining whether the selected external display device is turned on/off, transmitting a remote power on-command and a screen sharing command to the selected external display
(Continued)

device through the communication unit if the selected external display device is turned off, receiving content from the selected external display device through the communication unit, and playing back the received content through the display unit.

12 Claims, 9 Drawing Sheets

(51) Int. Cl.

| | | |
|---|---|---|
| *H04N 21/422* | (2011.01) | |
| *H04N 21/431* | (2011.01) | |
| *H04N 21/436* | (2011.01) | |
| *H04N 21/443* | (2011.01) | |
| *H04N 21/488* | (2011.01) | |

(52) U.S. Cl.
CPC ..... *H04N 21/431* (2013.01); *H04N 21/43615* (2013.01); *H04N 21/4432* (2013.01); *H04N 21/4882* (2013.01)

(58) Field of Classification Search
CPC ........... H04N 21/4432; H04N 21/4882; H04N 21/4312
See application file for complete search history.

(56) References Cited

U.S. PATENT DOCUMENTS

| | | | |
|---|---|---|---|
| 2012/0324362 A1* | 12/2012 | Jung ................... | G06F 11/3051 |
| | | | 715/738 |
| 2017/0085938 A1* | 3/2017 | Yeom ................... | H04N 21/431 |
| 2017/0147129 A1* | 5/2017 | Kyoun ............... | H04N 21/4858 |

FOREIGN PATENT DOCUMENTS

| | | |
|---|---|---|
| KR | 10-2013-0033044 | 4/2013 |
| KR | 10-2015-0026367 | 3/2015 |
| KR | 10-2016-0029551 | 3/2016 |
| KR | 10-2016-0092363 | 8/2016 |
| KR | 10-2017-0007980 | 1/2017 |
| KR | 10-2017-0035167 | 3/2017 |
| KR | 10-2017-0107753 | 9/2017 |
| KR | 10-2020-0022040 | 3/2020 |
| KR | 10-2021-0039551 | 4/2021 |
| KR | 10-2021-0056762 | 5/2021 |

OTHER PUBLICATIONS

PCT International Application No. PCT/KR2022/006572, International Search Report dated Jan. 25, 2023, 4 pages.

* cited by examiner

<u>800</u>

100_2

1000

DISPLAY DEVICE AND CONTENT SHARING METHOD FOR SHARING CONTENT WITH EXTERNAL DISPLAY DEVICE

CROSS-REFERENCE TO RELATED APPLICATIONS

This application is the National Stage filing under 35 U.S.C. 371 of International Application No. PCT/KR2022/006572, filed on May 9, 2022, which claims the benefit of earlier filing date and right of priority to Korean Application No. 10-2022-0051891, filed on Apr. 27, 2022, the contents of which are all hereby incorporated by reference herein in their entireties.

TECHNICAL FIELD

The present disclosure relates to a display device and a content sharing method that share content with an external display device.

BACKGROUND ART

A display device is a device that has the function of receiving, processing, and displaying images that can be viewed by a user. For example, a display device receives a broadcast signal selected by a user from among broadcast signals transmitted from a broadcasting station, separates an image signal from the received signal, and then displays the separated image signal on a display.

Meanwhile, as display devices have been supplied in large quantities recently, there are increasing cases of having multiple display devices in the home. Accordingly, when multiple display devices are located in different spaces, there is an increasing demand to continue viewing content being viewed on a display device located in a different space.

However, there are many cumbersome and inconvenient problems in the way a user shares content they are viewing through a display device to a display device in another space.

DISCLOSURE

Technical Problem

An object of the present disclosure is to provide a display device and a content sharing method that can share content with each other by sending and retrieving content between a plurality of display devices.

An object of the present disclosure is to provide a display device and a content sharing method that enhance the convenience of content sharing by enabling content to be shared by remotely executing a power-on operation according to whether the power of the display device, which is the target of content sharing, is turned on or off.

Technical Solution

A display device according to an embodiment of the present disclosure may include a display part; a communication part for transmitting and receiving data with at least one external display device; a user input part for receiving a screen loading command from a remote control device; and a control part for providing a screen selection interface for selecting an external display device to which a screen is loaded in response to the screen loading command, receiving a selection of an external display device to which a screen is loaded, determining whether the selected external display device is powered on/off, transmitting a remote power-on command and a screen sharing command to the selected external display device through the communication part when the selected external display device is powered off, receiving content from the selected external display device through the communication part, and playing back the received content through the display part.

Advantageous Effect

A display device according to one embodiment of the present disclosure enables convenient content sharing by sending and retrieving content from and to another external display device.

A display device according to an embodiment of the present disclosure enables convenient content sharing by remotely turning on the power of a display device that is a content sharing target according to whether the power is turned on or off.

BEST MODE

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

Figure 1:
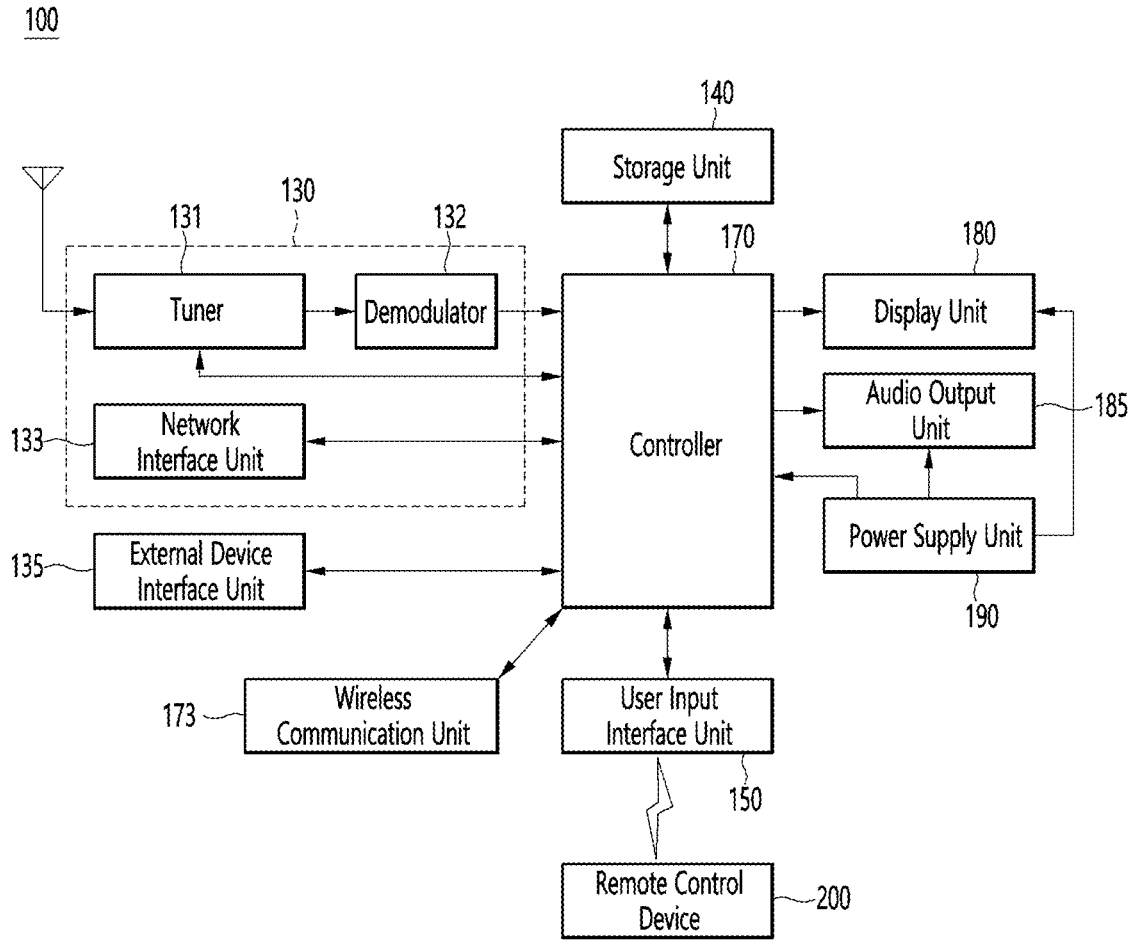
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 may include a broadcast reception module 130, an external device interface part 135, a storage unit 140, a user input part 150, a control part 170, a wireless communication interface part 173, a display part 180, an audio output unit 185, and a power supply unit 190.

The broadcast reception module 130 may include a tuner 131, a demodulator 132, and a network interface 133.

The tuner 131 may select a specific broadcast channel according to a channel selection command. The tuner 131 may receive broadcast signals for the selected specific broadcast channel.

The demodulation unit 132 may divide the received broadcast signals into video signals, audio signals, and broadcast program-related data signals, and may restore the divided video signals, audio signals, and data signals into an output available form.

The network interface 133 may provide an interface for connecting the display device 100 to a wired/wireless network comprising internet network. The network interface 133 may transmit or receive data to or from another user or another electronic device through an accessed network or another network linked to the accessed network.

The network interface part 133 may access a predetermined webpage through an accessed network or another network linked to the accessed network. That is, the network interface part 133 may transmit or receive data to or from a corresponding server by accessing a predetermined webpage through the network.

The network interface part 133 may receive content or data provided from a content provider or a network operator. That is, the network interface part 133 may receive content, such as movies, advertisements, games, VODs, and broadcast signals, which are provided from the content provider or the network operator, and information relating thereto through the network.

In addition, the network interface part 133 may receive firmware update information and update files provided from the network operator, and may transmit data to the Internet or content provider or the network operator.

The network interface 133 may select and receive a desired application among applications open to the air, through network.

The external device interface part 135 may receive an application or an application list in an adjacent external device and deliver the application or the application list to the control part 170 or the storage unit 140.

The external device interface part 135 may provide a connection path between the display device 100 and an external device. The external device interface part 135 may receive at least one of an image or audio outputted from an external device that is wirelessly or wiredly connected to the display device 100 and deliver the received image or the audio to the controller. The external device interface part 135 may include a plurality of external input terminals. The plurality of external input terminals may include an RGB terminal, at least one High Definition Multimedia Interface (HDMI) terminal, and a component terminal.

An image signal of an external device inputted through the external device interface part 135 may be outputted through the display part 180. A sound signal of an external device inputted through the external device interface part 135 may be outputted through the audio output unit 185.

An external device connectable to the external device interface part 135 may be one of a set-top box, a Blu-ray player, a DVD player, a game console, a sound bar, a smartphone, a PC, a USB Memory, and a home theater system but this is just exemplary.

Additionally, some content data stored in the display device 100 may be transmitted to a user or an electronic device, which is selected from other users or other electronic devices pre-registered in the display device 100.

The storage unit 140 may store signal-processed image, voice, or data signals stored by a program in order for each signal processing and control in the control part 170.

In addition, the storage unit 140 may perform a function for temporarily storing image, voice, or data signals output from the external device interface part 135 or the network interface part 133, and may store information on a predetermined image through a channel memory function.

The storage unit 140 may store an application or an application list input from the external device interface part 135 or the network interface part 133.

The display device 100 may play content files (e.g., video files, still image files, music files, document files, application files, etc.) stored in the storage unit 140, and may provide the content files to a user.

The user input part 150 may transmit signals input by a user to the control part 170, or may transmit signals from the control part 170 to a user. For example, the user input part 150 may receive or process control signals such as power on/off, channel selection, and screen setting from the remote control device 200 or transmit control signals from the control part 170 to the remote control device 200 according to various communication methods such as Bluetooth, Ultra Wideband (WB), ZigBee, Radio Frequency (RF), and IR communication methods.

In addition, the user input part 150 may transmit, to the control part 170, control signals input from local keys (not shown) such as a power key, a channel key, a volume key, and a setting key.

Image signals that are image-processed by the control part 170 may be input to the display part 180 and displayed as images corresponding to the image signals. In addition, image signals that are image-processed by the control part 170 may be input to an external output device through the external device interface part 135.

Voice signals processed by the control part 170 may be output to the audio output unit 185. In addition, voice signals processed by the control part 170 may be input to the external output device through the external device interface part 135.

Additionally, the control part 170 may control overall operations of the display device 100.

In addition, the control part 170 may control the display device 100 by a user command or an internal program input through the user input part 150, and may access the network to download a desired application or application list into the display device 100.

The control part 170 may output channel information selected by a user together with the processed image or voice signals through the display part 180 or the audio output unit 185.

In addition, the control part 170 may output image signals or voice signals of an external device such as a camera or a camcorder, which are input through the external device interface part 135, through the display part 180 or the audio output unit 185, according to an external device image playback command received through the user input part 150.

Moreover, the control part 170 may control the display part 180 to display images, and may control the display part 180 to display broadcast images input through the tuner 131, external input images input through the external device interface part 135, images input through the network interface part, or images stored in the storage unit 140. In this case, an image displayed on the display part 180 may be a still image or video and also may be a 2D image or a 3D image.

Additionally, the control part 170 may play content stored in the display device 100, received broadcast content, and external input content input from the outside, and the content may be in various formats such as broadcast images, external input images, audio files, still images, accessed web screens, and document files.

Moreover, the wireless communication part 173 may perform wired or wireless communication with an external device. The wireless communication part 173 may perform short-range communication with an external device. For this, the wireless communication part 173 may support short-range communication by using at least one of Bluetooth™, Bluetooth Low Energy (BLE), Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication part 173 may support wireless communication between the display device 100 and a wireless communication system, between the display device 100 and another display device 100, or between networks including the display device 100 and another display device 100 (or an external server) through wireless area networks. The wireless area networks may be wireless personal area networks.

Herein, the other display device 100 may be a mobile terminal such as a wearable device (for example, a smart watch, a smart glass, and a head mounted display (HMD)) or a smartphone, which is capable of exchanging data (or inter-working) with the display device 100. The wireless communication part 173 may detect (or recognize) a wearable device capable of communication around the display device 100. Furthermore, if the detected wearable device is a device authenticated to communicate with the display device 100, the control part 170 may transmit at least part of data processed in the display device 100 to the wearable device through the wireless communication part 173. Therefore, a user of the wearable device may use the data processed by the display device 100 through the wearable device.

The voice acquisition part 175 may acquire audio. The voice acquisition part 175 may include at least one microphone (not shown) and may acquire audio around the display device 100 through the microphone (not shown).

The display part 180 may convert image signals, data signals, or on-screen display (OSD) signals, which are processed in the control part 170, or images signals or data signals, which are received in the external device interface part 135, into R, G, and B signals to generate driving signals.

Furthermore, the display device 100 shown in FIG. 1 is just one embodiment of the present disclosure and thus, some of the components shown may be integrated, added, or omitted according to the specification of the actually implemented display device 100.

That is, if necessary, two or more components may be integrated into one component, or one component may be divided into two or more components. Additionally, a function performed by each block is to describe an embodiment of the present disclosure and its specific operation or device does not limit the scope of the present disclosure.

According to another embodiment of the present disclosure, unlike FIG. 1, the display device 100 may receive images through the network interface part 133 or the external device interface part 135 and play them without including the tuner 131 and the demodulation unit 132.

For example, the display device 100 may be divided into an image processing device such as a set-top box for receiving broadcast signals or contents according to various network services and a content playback device for playing content input from the image processing device.

In this case, an operating method of a display device according to an embodiment of the present disclosure described below may be performed by one of the display device described with reference to FIG. 1, an image processing device such as the separated set-top box, and a content playback device including the display part 180 and the audio output unit 185.

The audio output unit 185 receives the audio-processed signal from the control part 170 to output an audio signal.

The power supply unit 190 supplies the corresponding power to the entire display device 100. Particularly, power may be supplied to the control part 170 that is capable of being implemented in the form of a system on chip (SOC), the display part 180 for displaying an image, the audio output unit 185 for outputting audio, and the like.

Specifically, the power supply unit 190 may include a converter that converts AC power to DC power and a DC/DC converter that converts a level of the DC power.

A remote control device according to an embodiment of the present disclosure will be described with reference to FIGS. 2 and 3.

Figure 2:
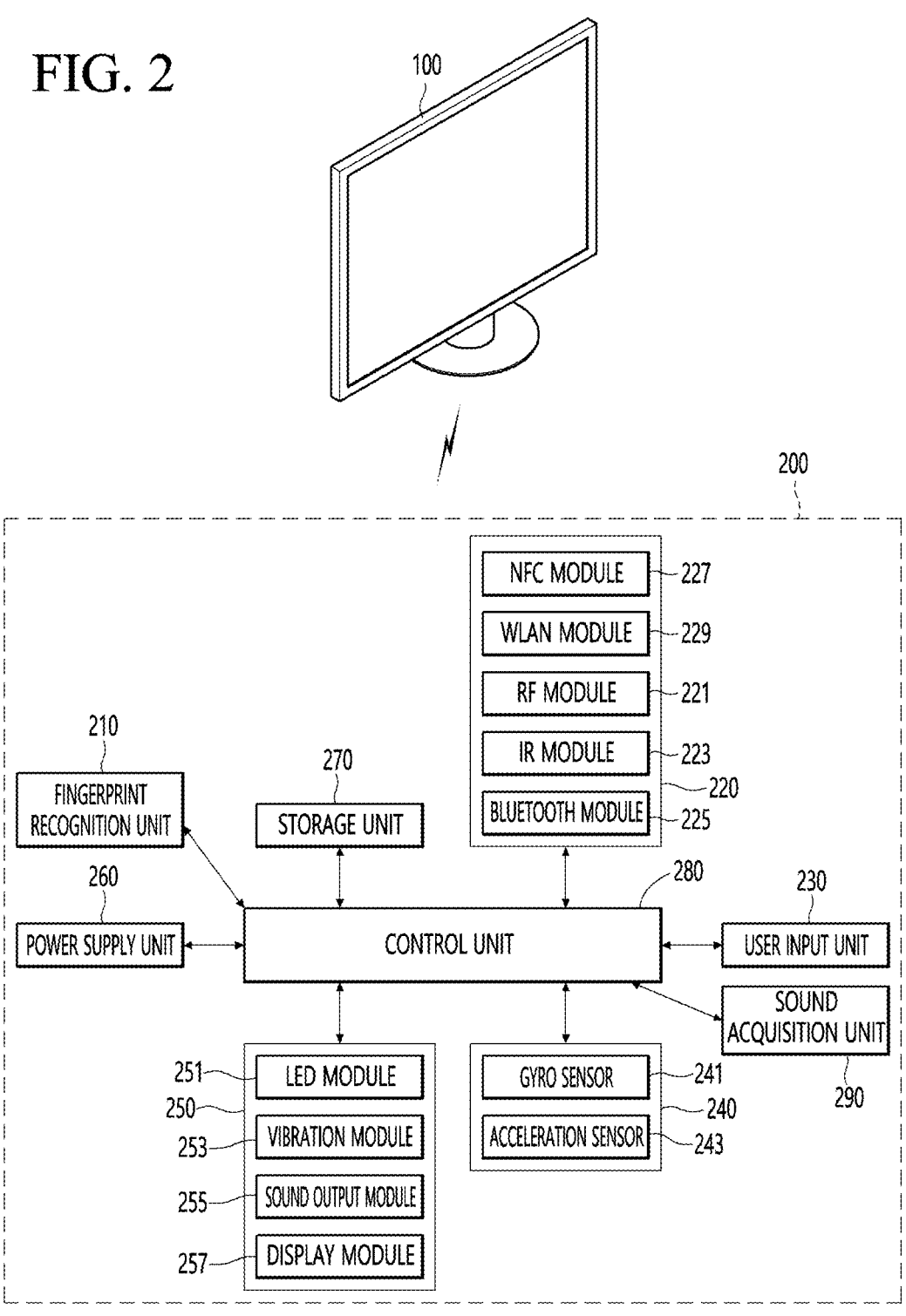
FIG. 2 is a block diagram illustrating a remote control device according to an embodiment of the present disclosure
Figure 3:
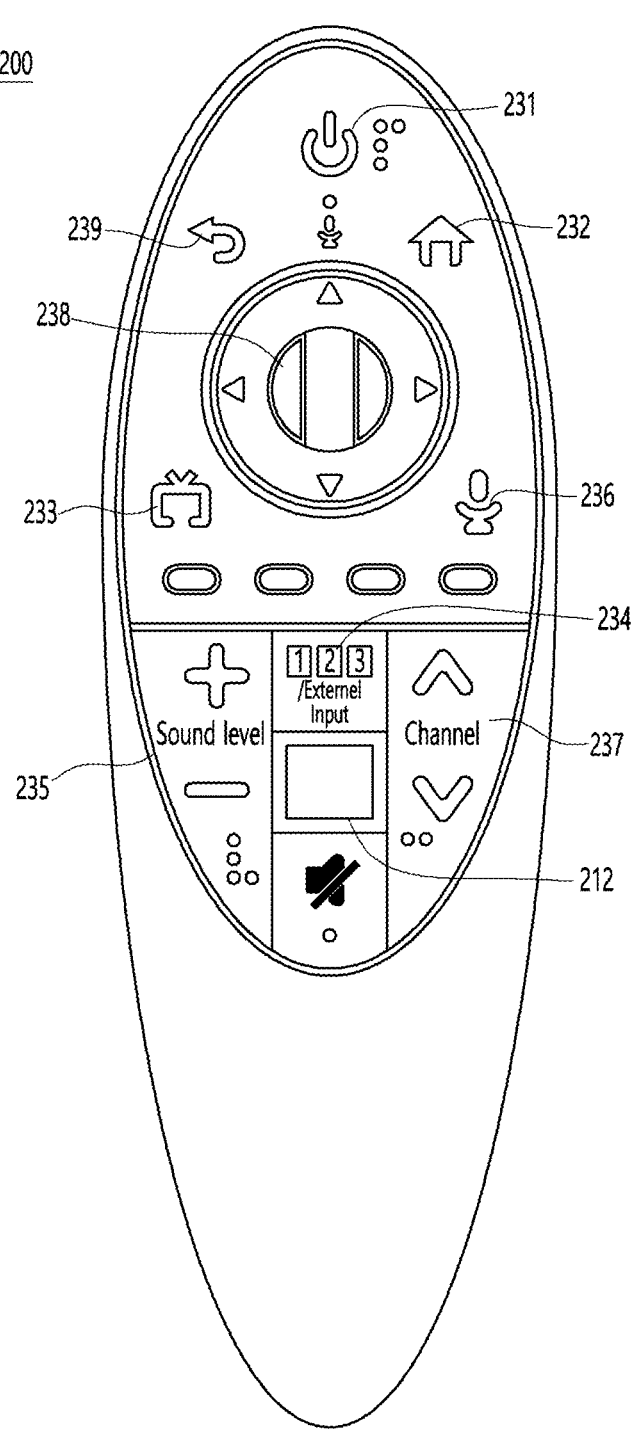
FIG. 3 is a view illustrating an actual configuration of a remote control device according to an embodiment of the present disclosure.

FIG. 2 is a block diagram illustrating a remote control device according to an embodiment of the present disclosure and FIG. 3 is a view illustrating an actual configuration of a remote control device according to an embodiment of the present disclosure.

First, referring to FIG. 2, a remote control device 200 may include a fingerprint recognition unit 210, a wireless communication part 220, a user input part 230, a sensor unit 240, an output unit 250, a power supply unit 260, a storage unit 270, a control part 280, and a sound acquisition unit 290.

Referring to FIG. 2, the wireless communication part 220 transmits/receives signals to/from an arbitrary any one of display devices according to the above-mentioned embodiments of the present disclosure.

The remote control device 200 may include a radio frequency (RF) module 221 capable of transmitting or receiving signals to or from the display device 100 according to an RF communication standard, and an IR module 223 capable of transmitting or receiving signals to or from the display device 100 according to an IR communication standard. In addition, the remote control device 200 may include a Bluetooth module 225 capable of transmitting or receiving signals to or from the display device 100 according to a Bluetooth communication standard. In addition, the remote control device 200 may include an NFC module 227 capable of transmitting or receiving signals to or from the display device 100 according to an NFC communication standard, and a wireless LAN (WLAN) module 229 capable of transmitting or receiving signals to or from the display device 100 according to a WLAN communication standard.

In addition, the remote control device 200 may transmit signals containing information on the movement of the remote control device 200 to the display device 100 through the wireless communication part 220.

Moreover, the remote control device 200 may receive signals transmitted from the display device 100 through the RF module 221 and if necessary, may transmit a command for power on/off, channel change, and volume change to the display device 100 through the IR module 223.

The user input part 230 may be configured with a keypad, a button, a touch pad, or a touch screen. A user may operate the user input part 230 to input a command relating to the display device 100 to the remote control device 200. If the user input part 230 includes a hard key button, a user may input a command relating to the display device 100 to the remote control device 200 through the push operation of the hard key button. This will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back button 239.

The fingerprint recognition button 212 may be a button for recognizing a user's fingerprint. According to an embodiment of the present disclosure, the fingerprint recognition button 212 may perform a push operation and receive a push operation and a fingerprint recognition operation. The power button 231 may be a button for turning on/off the power of the display device 100. The home button 232 may be a button for moving to the home screen of the display device 100. The live button 233 may be a button for displaying live broadcast programs. The external input button 234 may be a button for receiving an external input connected to the display device 100. The volume control button 235 may be a button for controlling a volume output from the display device 100. The voice recognition button 236 may be a button for receiving user's voice and recognizing the received voice. The channel change button 237 may be a button for receiving broadcast signals of a specific broadcast channel. The OK button 238 may be a button for selecting a specific function, and the back button 239 may be a button for returning to a previous screen.

FIG. 2 is described again.

If the user input part 230 includes a touch screen, a user may touch a soft key of the touch screen to input a command relating to the display device 100 to the remote control device 200. In addition, the user input part 230 may include various kinds of input interfaces operable by a user, for example, a scroll key and a jog key, and this embodiment does not limit the scope of the present disclosure.

The sensor unit 240 may include a gyro sensor 241 or an acceleration sensor 243. The gyro sensor 241 may sense information on the movement of the remote control device 200.

For example, the gyro sensor 241 may sense information on an operation of the remote control device 200 on the basis of x, y, and z axes and the acceleration sensor 243 may sense information on a movement speed of the remote control device 200. Moreover, the remote control device 200 may further include a distance measurement sensor that senses a distance with respect to the display part 180 of the display device 100.

The output unit 250 may output image or voice signals in response to the operation of the user input part 230, or may output image or voice signals corresponding to signals transmitted from the display device 100. A user may recognize whether the user input part 230 is operated or the display device 100 is controlled through the output unit 250.

For example, the output unit 250 may include an LED module 251 for flashing, a vibration module 253 for generating vibration, a sound output module 255 for outputting sound, or a display module 257 for outputting an image, if the user input part 230 is manipulated or signals are transmitted/received to/from the display device 100 through the wireless communication part 220.

Additionally, the power supply unit 260 supplies power to the remote control device 200 and if the remote control device 200 does not move for a predetermined time, stops the power supply, so that power waste may be reduced. The power supply unit 260 may resume the supply of power if a predetermined key provided at the remote control device 200 is operated.

The storage unit 270 may store various kinds of programs and application data required to control or operate the remote control device 200. If the remote control device 200 transmits/receives signals wirelessly through the display device 100 and the RF module 221, the remote control device 200 and the display device 100 transmits/receives signals through a predetermined frequency band.

The control part 280 of the remote control device 200 may store, in the storage unit 270, information on a frequency band for transmitting/receiving signals to/from the display device 100 paired with the remote control device 200 and refer to it.

The control part 280 controls general matters relating to the control of the remote control device 200. The control part 280 may transmit a signal corresponding to a predetermined key operation of the user input part 230 or a signal corresponding to the movement of the remote control device 200 sensed by the sensor unit 240 to the display device 100 through the wireless communication part 220.

In addition, the sound acquisition unit 290 of the remote control device 200 may acquire voice.

The sound acquisition unit 290 may include at least one microphone and acquire voice through the microphone.

Figure 4:
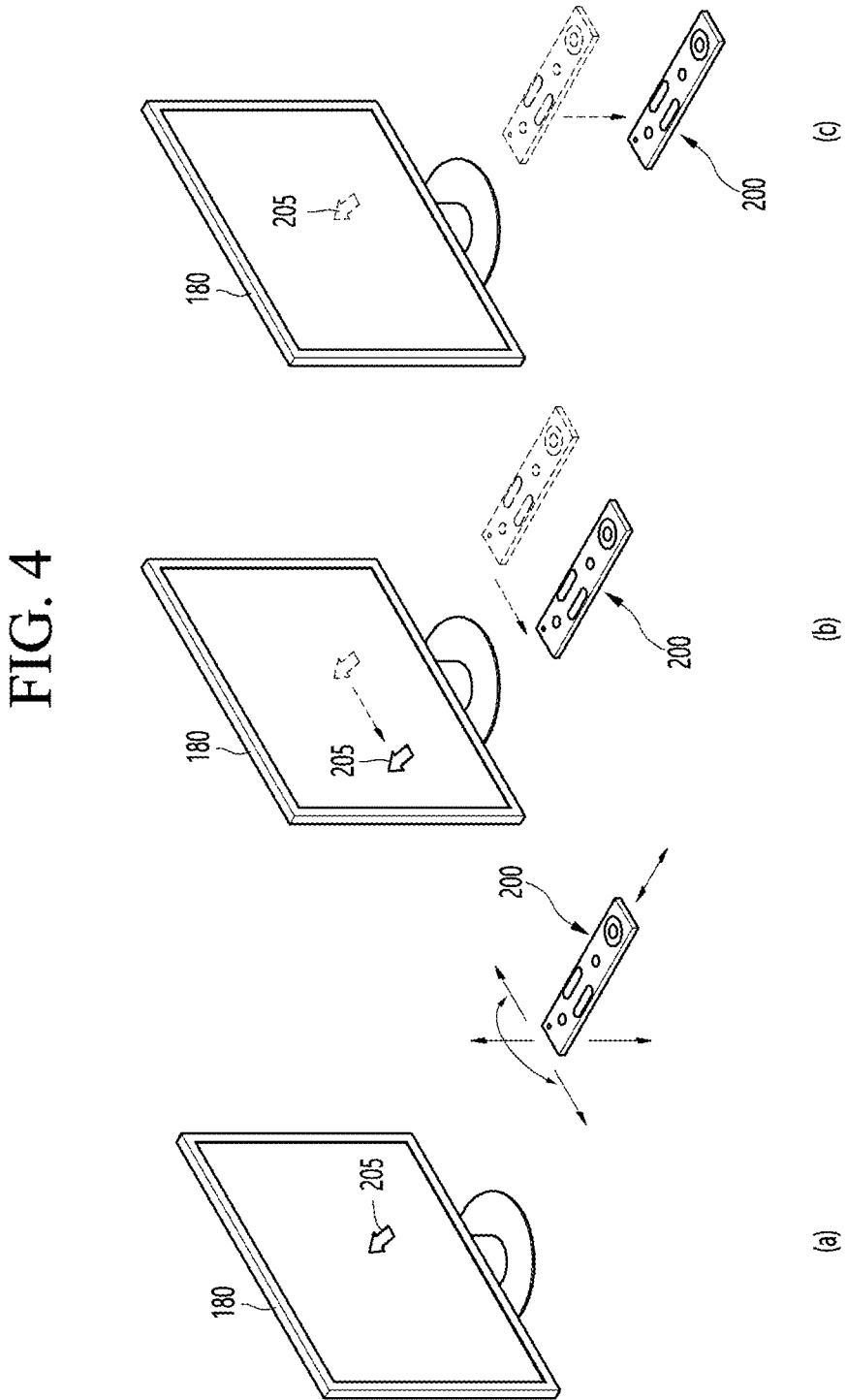
FIG. 4 is a view illustrating an example of utilizing a remote control device according to an embodiment of the present disclosure.

Next, FIG. 4 is described.

FIG. 4 is a view illustrating an example of utilizing a remote control device according to an embodiment of the present disclosure.

FIG. 4(a) illustrates that a pointer 205 corresponding to the remote control device 200 is displayed on the display part 180.

A user may move or rotate the remote control device 200 vertically or horizontally. The pointer 205 displayed on the display part 180 of the display device 100 corresponds to a movement of the remote control device 200. Since the corresponding pointer 205 is moved and displayed according to a movement on a 3D space as show in the drawing, the remote control device 200 may be referred to as a spatial remote control device.

FIG. 4(b) illustrates that if a user moves the remote control device 200, the pointer 205 displayed on the display part 180 of the display device 100 is moved to the left according to the movement of the remote control device 200.

Information on a movement of the remote control device 200 detected through a sensor of the remote control device 200 is transmitted to the display device 100. The display device 100 may calculate the coordinates of the pointer 205 from the information on the movement of the remote control device 200. The display device 100 may display the pointer 205 to match the calculated coordinates.

FIG. 4(c) illustrates that while a specific button in the remote control device 200 is pressed, a user moves the remote control device 200 away from the display part 180. Thus, a selected region in the display part 180 corresponding to the pointer 205 may be zoomed in and displayed in an enlarged size.

On the other hand, if a user moves the remote control device 200 close to the display part 180, a selection area in the display part 180 corresponding to the pointer 205 may be zoomed out and displayed in a reduced size.

On the other hand, if the remote control device 200 is moved away from the display part 180, a selection area may be zoomed out and if the remote control device 200 is moved closer to the display part 180, a selection area may be zoomed in.

Additionally, if a specific button in the remote control device 200 is pressed, recognition of a vertical or horizontal movement may be excluded. That is, if the remote control device 200 is moved away from or closer to the display part 180, the up, down, left, or right movement cannot be recognized and only the back and forth movement may be recognized. While a specific button in the remote control device 200 is not pressed, only the pointer 205 is moved according to the up, down, left or right movement of the remote control device 200.

Moreover, the moving speed or moving direction of the pointer 205 may correspond to the moving speed or moving direction of the remote control device 200.

Furthermore, a pointer in this specification means an object displayed on the display part 180 in response to an operation of the remote control device 200. Therefore, in addition to the arrow form displayed as the pointer 205 in the drawing, various forms of objects are possible. For example, the above concept includes a point, a cursor, a prompt, and a thick outline. Then, the pointer 205 may be displayed in correspondence to one point of a horizontal axis and a vertical axis on the display part 180 and also may be displayed in correspondence to a plurality of points such as a line and a surface.

Figure 5:
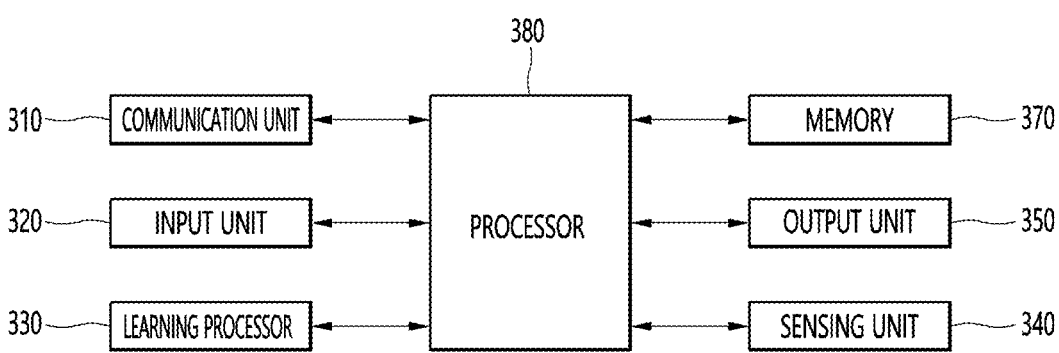
FIG. 5 illustrates an artificial intelligence apparatus according to an embodiment of the present disclosure.

FIG. 5 illustrates an AI device 300 according to an embodiment of the present disclosure.

The AI device 300 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 5, the AI device 300 may include a communication part 310, an input part 320, a learning processor 330, a sensing unit 340, an output unit 350, a memory 370, and a processor 380.

The communication part 310 may transmit and receive data to and from external devices or other AI devices by using wire/wireless communication technology. For example, the communication part 310 may transmit and receive sensor information, a user input, a learning model, and a control signal to and from external devices.

The communication technology used by the communication part 310 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input part 320 may acquire various kinds of data.

In this case, the input part 320 may include a camera for inputting a video signal, a microphone for receiving an audio signal, and a user input part for receiving information from a user. The camera or the microphone may be treated as a sensor, and the signal acquired from the camera or the microphone may be referred to as sensing data or sensor information.

The input part 320 may acquire a learning data for model learning and an input data to be used if an output is acquired by using learning model. The input part 320 may acquire raw input data. In this case, the processor 380 or the learning processor 330 may extract an input feature by preprocessing the input data.

The learning processor 330 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 330 may include a memory integrated or implemented in the AI device 300. Alternatively, the learning processor 330 may be implemented by using the memory 370, an external memory directly connected to the AI device 300, or a memory held in an external device.

The sensing unit 340 may acquire at least one of internal information about the AI device 300, ambient environment information about the AI device 300, and user information by using various sensors.

Examples of the sensors included in the sensing unit 340 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 350 may generate an output related to a visual sense, an auditory sense, or a haptic sense.

At this time, the output unit 350 may include a display part for outputting time information, a speaker for outputting auditory information, and a haptic module for outputting haptic information.

The memory 370 may store data that supports various functions of the AI device 300. For example, the memory 370 may store input data acquired by the input part 320, learning data, a learning model, a learning history, and the like.

The processor 380 may determine at least one executable operation of the AI device 300 based on information determined or generated by using a data analysis algorithm or a machine learning algorithm. The processor 380 may control the components of the AI device 300 to execute the determined operation.

To this end, the processor 380 may request, search, receive, or utilize data of the learning processor 330 or the memory 370. The processor 380 may control the components of the AI device 300 to execute the predicted operation or the operation determined to be desirable among the at least one executable operation.

When the connection of an external device is required to perform the determined operation, the processor 380 may generate a control signal for controlling the external device and may transmit the generated control signal to the external device.

The processor 380 may acquire intention information for the user input and may determine the user's requirements based on the acquired intention information.

The processor 380 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 330.

The processor 380 may collect history information including the operation contents of the AI apparatus 100 or the user's feedback on the operation and may store the collected history information in the memory 370 or the learning processor 330 or transmit the collected history information to the external device. The collected history information may be used to update the learning model.

The processor 380 may control at least part of the components of AI device 300 so as to drive an application program stored in the memory 370. Furthermore, the processor 380 may operate two or more of the components included in the AI device 300 in combination so as to drive the application program.

Meanwhile, the communication part 310 may be referred to as a network interface 310.

Figure 6:
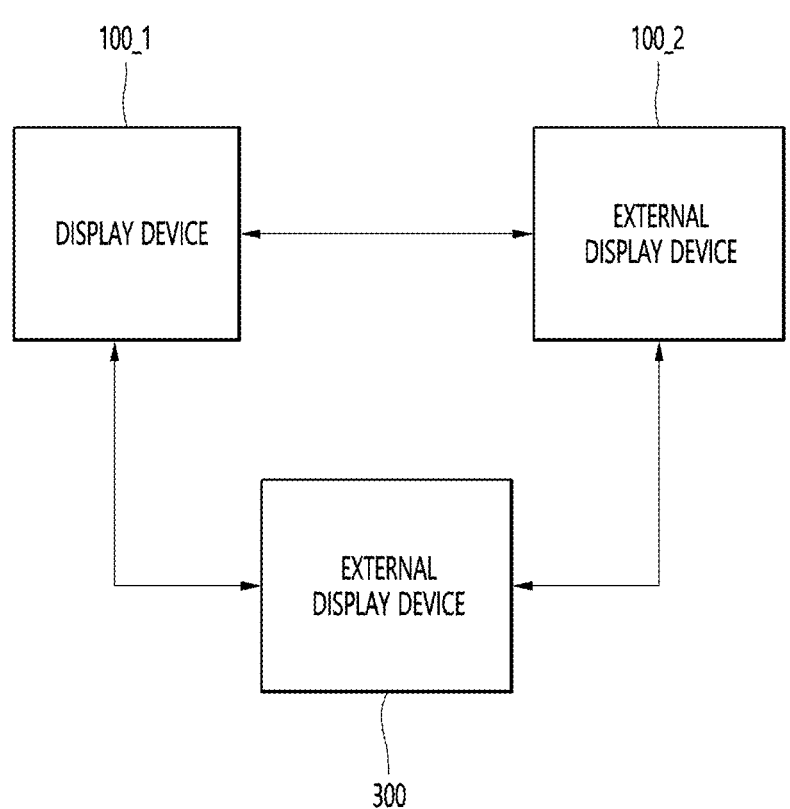
FIG. 6 is a block diagram illustrating a content sharing system between display devices according to an embodiment of the present disclosure.

FIG. 6 is a block diagram illustrating a content sharing system between display devices according to an embodiment of the present disclosure.

The content sharing system 10 may include a display device 100_1, at least one external display device 100_2, and an artificial intelligence device 300. Each of the display device 100_1 and the external display device 100_2 may be referred to as a first display device 100_1 and a second display device 100_2. There may be a plurality of external display devices 100_2 connected to the display device 100_1.

The first display device 100_1 may provide a connection setup interface for establishing a connection with the second display device 100_2. The connection setup interface may enable direct connection of the second display device 100_2 from the first display device 100_1 and may also enable connection of the second display device 100_2 via an artificial intelligence device 300.

Meanwhile, the first display device 100_1 may provide a content sharing interface that enables content to be shared with the second display device 100_2.

For example, the first display device 100_1 can receive and display content being played by the second display device 100_2, or can share content by transmitting the content being played by the first display device 100_1 to the second display device 100_2.

Figure 7:
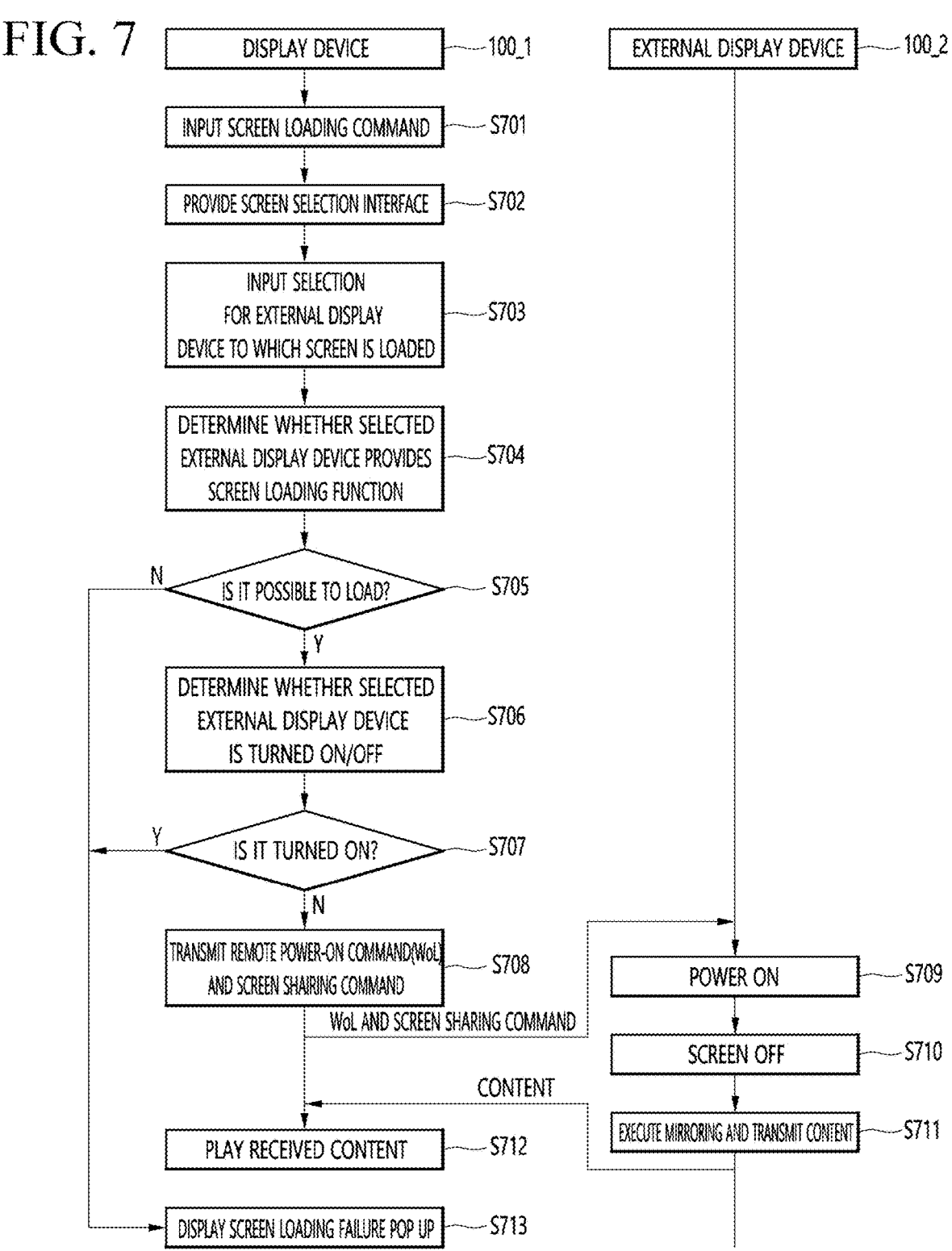
FIG. 7 is a flowchart illustrating a content sharing method through screen loading according to one embodiment of the present disclosure.

FIG. 7 is a flowchart illustrating a content sharing method through screen loading according to one embodiment of the present disclosure.

Referring to FIG. 7, the user input interface part 150 of the display device 100_1 can receive a screen loading command from a remote control device 200 (S701).

Additionally, the voice acquisition part 175 of the display device 100_1 can receive a user utterance including a screen loading command.

Meanwhile, the control part 170 of the display device 100_1 can provide a screen selection interface for selecting an external display device to which a screen is loaded in response to a screen loading command input through the user input interface part 150 or voice acquisition part 175 (S702).

Figure 8:
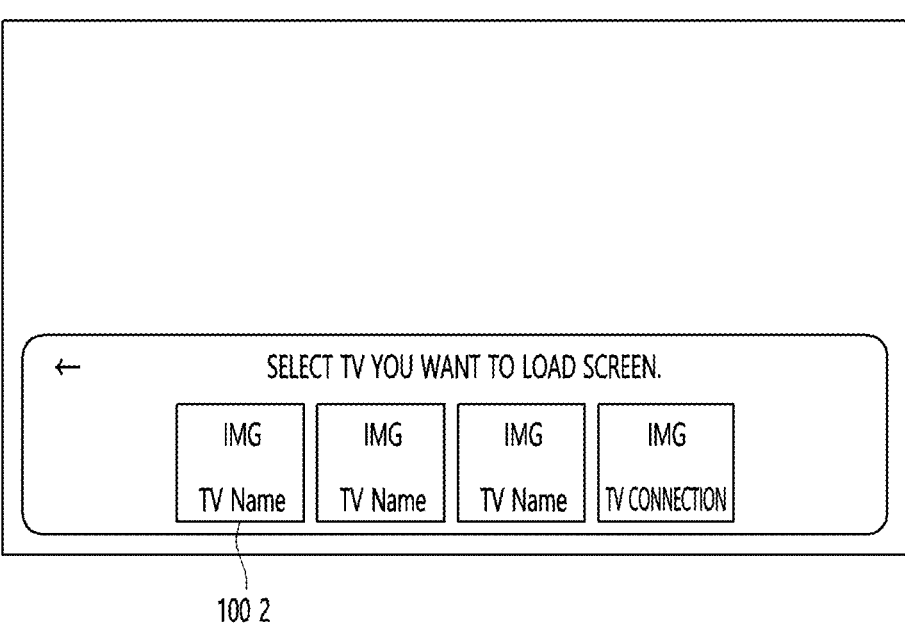
FIG. 8 is a view illustrating a screen selection interface according to one embodiment of the present disclosure.

FIG. 8 is a view illustrating a screen selection interface according to one embodiment of the present disclosure.

Referring to FIG. 8, the control part 170 of the display device 100_1 can display a screen selection interface 800 on the display part 180. The screen selection interface 800 can display a plurality of selectable external display devices.

The plurality of selectable external display devices may be display devices preset to share their screens on the same network as the display device 100_1.

Referring again to FIG. 7, the control part 170 can receive a selection for an external display device 100_2 to which a screen is loaded through the user input interface part 150 or voice acquisition part 175 (S703).

The control part 170 of the display device 100_1 can determine whether the selected external display device 100_2 provides a screen loading function (S704). This is because the external display device 100_2 may not provide a function for a screen loading request according to the model specifications.

Meanwhile, the control part 170 can display a screen loading failure pop-up through the display part 180 if the selected external display device 100_2 does not provide a screen loading function (S705, S713).

Meanwhile, the control part 170 can determine whether the selected external display device 100_2 is turned on/off (S706).

Meanwhile, the control part 170 can display the screen loading failure pop-up through the display part 180 when the power of the selected external display device 100_2 is turned on (S707, S713). When the screen loading function is activated, the screen of the selected external display device 100_2 is turned off, so that when the selected external display device 100_2 is turned on and in use, screen loading may not be possible.

Meanwhile, the control part 170 can transmit a remote power-on command (WoL: Wake on Lan) and a screen sharing command to the external display device 100_2 through the communication part 110 when the selected external display device 100_2 is turned off (S708).

Meanwhile, the external display device 100_2 can turn on the power in response to the received remote power-on command (S709). Meanwhile, the external display device 100_2 can have the screen in an active state for a predetermined time while the power is turned on, and then the screen can be turned off before the content is played (S710). This is because there are cases where the content should not be played on a plurality of display devices.

The control part 170 can transmit content to the display device 100_1 by executing mirroring after the screen is turned off (S711).

Meanwhile, the control part 170 can receive content from an external display device 100_2 through the communication part 110 and play the received content through the display part (S712).

Figure 9:
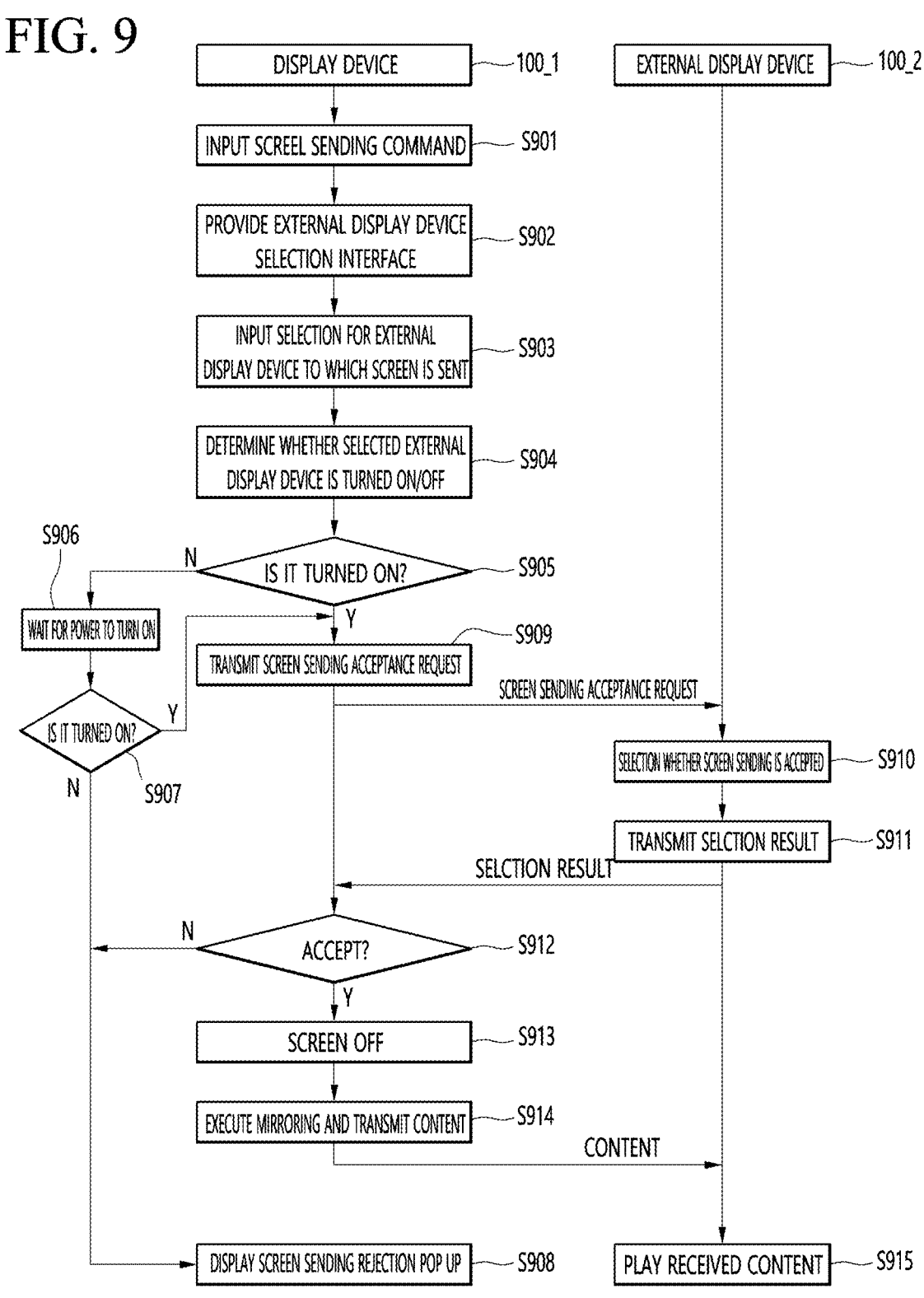
FIG. 9 is a flowchart illustrating a content sharing method through screen sending according to one embodiment of the present disclosure.

FIG. 9 is a flowchart illustrating a content sharing method through screen sending according to one embodiment of the present disclosure.

Referring to FIG. 9, the user input interface part 150 of the display device 100_1 can receive a screen sending command from a remote control device 200 (S901).

Additionally, the voice acquisition part 175 of the display device 100_1 can receive user utterance including a screen sending command.

Meanwhile, the control part 170 of the display device 100_1 may provide an external display device selection interface for selecting an external display device to which a screen is to be sent in response to a screen sending command input through the user input interface part 150 or voice acquisition part 175 (S902).

Figure 10:
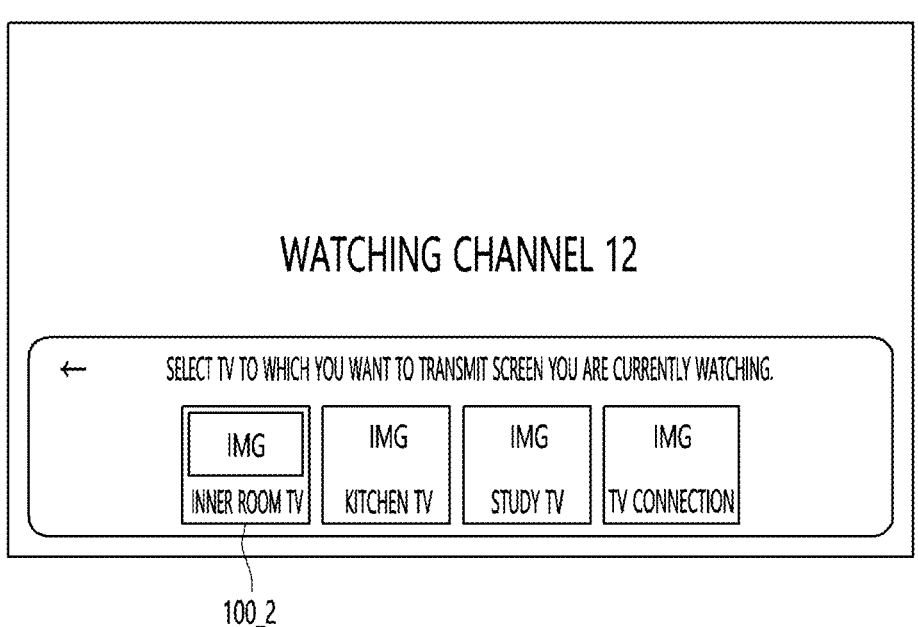
FIG. 10 is a view illustrating an external display device selection interface according to one embodiment of the present disclosure.

FIG. 10 is a view illustrating an external display device selection interface according to one embodiment of the present disclosure.

Referring to FIG. 10, the control part 170 of the display device 100_1 can display an external display device selection interface 1000 on the display part 180. The external display device selection interface 1000 can display a plurality of selectable external display devices.

The plurality of selectable external display devices may be display devices preset to share their screens on the same network as the display device 100_1.

Referring again to FIG. 7, the control part 170 can receive a selection for an external display device 100_2 to which a screen is to be sent through the user input interface part 150 or voice acquisition part 175 (S903).

Meanwhile, the control part 170 can determine whether the selected external display device 100_2 is turned on/off (S904).

Meanwhile, the control part 170 waits for the power-on state of the external display device 100_2 for a predetermined period of time if the power of the selected external display device 100_2 is off, and if the power of the external display device 100_2 is not turned on for a predetermined period of time, a screen sending rejection pop-up can be displayed through the display part 180 (S905, S906, S907, S908). This is an action to determine that the selected external display device 100_2 refuses to share the screen if the power is continuously turned off.

Meanwhile, the control part 170 can transmit a screen sending acceptance request through the communication part 110 when the selected external display device 100_2 is turned on (S909).

Meanwhile, the external display device 100_2 can receive a user selection regarding whether to accept screen sending in response to a received screen sending acceptance request (S910).

Meanwhile, the external display device 100_2 can transmit the selection result regarding whether to accept screen sending to the display device 100_1 (S911).

The control part 170 of the display device 100_1 can display a screen sending rejection pop-up on the display part 180 if the screen sending is not accepted based on the received selection result (S908).

Meanwhile, the control part 170 of the display device 100_1 may turn off the screen (S912) if the screen sending is accepted based on the received selection result. This is because there are cases where the content should not be played on the plurality of display devices.

Additionally, the control part 170 can execute mirroring after the screen is turned off to transmit the content to an external display device 100_2 (S913).

Meanwhile, the external display device 100_2 can receive content and play the received content (S914).

The above description is merely an illustrative explanation of the technical idea of the present disclosure, and various modifications and variations will be possible to those skilled in the art without departing from the essential characteristics of the present disclosure.

Accordingly, the embodiments disclosed in the present disclosure are not intended to limit the technical idea of the present disclosure, but are for illustrative purposes, and the scope of the technical idea of the present disclosure is not limited by these embodiments.

The scope of protection of the present disclosure should be interpreted in accordance with the claims below, and all technical ideas within the equivalent scope should be interpreted as being included in the scope of rights of the present disclosure.

INDUSTRIAL APPLICABILITY

The display device according to the present disclosure has remarkable industrial applicability because it has the effect of allowing convenient content sharing by sending and receiving content to and from another external display device.

What is claimed is:

1. A display device comprising:
a display;
a communication interface; and
a controller configured to:
receive a command from a remote control device;
cause the display to display a screen selection interface in response to the command, wherein the screen selection interface identifies a plurality of external display devices that are individually selectable by a user,
receive a selection of a selected external display device, from among the plurality of external display devices, for which content is to be loaded from for display at the display device,
determine whether the selected external display device does provide, or does not provide, a screen loading function,
determine whether the selected external display device is powered on or is powered off,
cause the display to display a screen loading failure pop-up when the selected external display device does provide the screen loading function and when the selected external display device is determined to be powered on,
transmit a remote power-on command and a screen sharing command to the selected external display device through the communication interface, when the selected external display device is determined to be powered off,
receive the content from the selected external display device through the communication interface, in response to the screen sharing command, and
cause the display to display the received content.

2. The display device of claim 1, further comprising a microphone configured to receive a user utterance including the command.

3. The display device of claim 1, wherein the controller is further configured to:
cause the display to display a screen loading failure pop-up, when the selected external display device does not provide the screen loading function.

4. The display device of claim 1, wherein the remote power-on command causes the selected external display device to:
power on a display of the selected external display device for a defined period of time, and
power off the display of the selected external display device prior to the displaying of the received content on the display of the display device.

5. The display device of claim 1, wherein the controller is further configured to:
receive a screen sending command from the remote control device,
cause the display to display an external display device selection interface for selecting an external display device to which a screen is to be sent in response to the screen sending command,
receive a selection for an external display device to which a screen is to be sent,
determine whether the external display device to which the screen is to be sent is powered on or is powered off,

transmit a screen sending acceptance request through the
  communication interface when the external display
  device to which the screen is to be sent is powered on,
  and
turn off the screen and execute mirroring to transmit
  content to the external display device to which the
  screen is to be sent, when screen sending is accepted by
  the external display device to which the screen is to be
  sent.
  6. The display device of claim 5, wherein the controller is
further configured to:
  if power of the external display device to which the screen
    is to be sent is off, wait for a power-on state for a
    predetermined period of time, and
  if the power of the external display device to which the
    screen is to be sent is not turned on for a predetermined
    period of time, cause the display to display a screen
    sending rejection pop-up.
  7. The display device of claim 5, wherein the controller is
further configured to:
  cause the display to display a screen sending rejection
    pop-up, if the screen sending is not accepted from the
    external display device to which the screen is to be sent.
  8. A content sharing method performed by a display
device, comprising:
  receiving a command from a remote control device;
  displaying, on a display, a screen selection interface in
    response to the command, wherein the screen selection
    interface identifies a plurality of external display
    devices that are individually selectable by a user,
  receiving a selection of a selected external display device,
    from among the plurality of external display devices,
    for which content is to be loaded from for display at the
    display device,
  determining whether the selected external display device
    does provide, or does not provide, a screen loading
    function,
  determining whether the selected external display device
    is powered on or is powered off,
  displaying, on the display, a screen loading failure pop-up,
    based on the selected external display device providing
    the screen loading function and based on the selected
    external display device being determined to be powered
    on,

16 transmitting a remote power-on command and a screen
    sharing command to the selected external display
    device, based on the selected external display device
    being determined to be powered off,
  receiving the content from the selected external display
    device, in response to the screen sharing command, and
  displaying, on the display, the received content.
  9. The method of claim 8, further comprising:
  displaying, on the display, a screen loading failure pop-up,
    based on the selected external display device not pro-
    viding the screen loading function.
  10. The method of claim 8, further comprising:
  receiving a screen sending command from the remote
    control device,
  displaying, on the display, an external display device
    selection interface for selecting an external display
    device to which a screen is to be sent in response to the
    screen sending command,
  receiving a selection for an external display device to
    which a screen is to be sent,
  determining whether the external display device to which
    the screen is to be sent is powered on or is powered off,
  transmitting a screen sending acceptance request, based
    on the external display device to which the screen is to
    be sent being powered on, and
  turning off the screen and executing mirroring to transmit
    content to the external display device to which the
    screen is to be sent, based on the screen sending being
    accepted by the external display device to which the
    screen is to be sent.
  11. The method of claim 10, further comprising:
  waiting for a power-on state for a predetermined period of
    time, based on power of the external display device to
    which the screen is to be sent being off, and
  displaying, on the display, a screen sending a rejection
    pop-up, based on the power of the external display
    device to which the screen is to be sent being not turned
    on for a predetermined period of time.
  12. The method of claim 10, further comprising:
  cause the display to display a screen sending rejection
    pop-up, based on the screen sending being not accepted
    from the external display device to which the screen is
    to be sent.

* * * * *